(12) United States Patent
Shen (10) Patent No.: US 10,645,105 B2
(45) Date of Patent: May 5, 2020

(54) NETWORK ATTACK DETECTION METHOD AND DEVICE (71) Applicants: NSFOCUS INFORMATION TECHNOLOGY CO., LTD., Beijing (CN); NSFOCUS TECHNOLOGIES, INC., Beijing (CN)

(72) Inventor: Junli Shen, Beijing (CN)

(73) Assignees: NSFOCUS INFORMATION TECHNOLOGY CO., LTD., Beijing (CN); NSFOCUS TECHNOLOGIES, INC., Beijing (CN)

( * ) Notice: Subject to any disclaimer, the term of this patent is extended or adjusted under 35 U.S.C. 154(b) by 136 days.

(21) Appl. No.: 15/745,057

(22) PCT Filed: Aug. 17, 2016

(86) PCT No.: PCT/CN2016/095714
§ 371 (c)(1),
(2) Date: Jan. 15, 2018

(87) PCT Pub. No.: WO2017/028789
PCT Pub. Date: Feb. 23, 2017

(65) Prior Publication Data
US 2018/0212986 A1 Jul. 26, 2018

(30) Foreign Application Priority Data
Aug. 17, 2015 (CN) .......................... 2015 1 0505895

(51) Int. Cl.
*G06F 11/00* (2006.01)
*G06F 12/14* (2006.01)
(Continued)

(52) U.S. Cl.
CPC .......... *H04L 63/1425* (2013.01); *H04B 1/38* (2013.01); *H04L 63/1483* (2013.01); *H04L 67/02* (2013.01)

(58) Field of Classification Search
CPC .............................. H04L 63/1425; H04B 1/38
(Continued)

(56) References Cited

U.S. PATENT DOCUMENTS

2005/0209844 A1* 9/2005 Wu ...................... G06F 17/2223
704/2
2010/0058178 A1* 3/2010 Dong ................... G06Q 10/107
715/256
2013/0086636 A1 4/2013 Golovanov

FOREIGN PATENT DOCUMENTS

CN 1889108 A 1/2007
CN 101155182 A 4/2008
(Continued)

OTHER PUBLICATIONS

International Search Report for International Patent Application No. PCT/CN2016/095714, filed on Aug. 17, 2016.

*Primary Examiner* — Wasika Nipa
*Assistant Examiner* — Samuel Ambaye (57) ABSTRACT

Provided are a network attack detection method and device. The method comprises: carrying out word segmentation to a character string to be detected and obtain words; determining the tuples corresponding to the to-be-detected character string; determining whether, in an attack model database, there are model tuples corresponding to the tuples, and whether there are model words corresponding to the first one of these words, the model tuples, the occurrence probability of each model tuple; if there are, acquiring the corresponding model tuples and the occurrence probability of the corresponding model words, and determining, according to the occurrence probability of the corresponding model (Continued)

tuples and the occurrence probability of the corresponding model words, the attack probability corresponding to the to-be-detected character string; and if the attack probability is larger than or equal to a preset probability threshold, determining that the to-be-detected character string is a character string having an attack behavior.

8 Claims, 3 Drawing Sheets

(51) Int. Cl.
    *G06F 12/16*     (2006.01)
    *G08B 23/00*     (2006.01)
    *H04L 29/06*     (2006.01)
    *H04B 1/38*     (2015.01)
    *H04L 29/08*     (2006.01)

(58) Field of Classification Search
    USPC .......................................................... 726/23
    See application file for complete search history.

(56) References Cited

FOREIGN PATENT DOCUMENTS

| | | |
|---|---|---|
| CN | 102663093 A | 9/2012 |
| CN | 103313248 A | 9/2013 |
| CN | 103678656 A | 3/2014 |
| CN | 103813279 A | 5/2014 |
| CN | 105187408 A | 12/2015 |
| JP | 2008545177 A | 12/2008 |
| JP | 2010506247 A | 2/2010 |

\* cited by examiner

NETWORK ATTACK DETECTION METHOD AND DEVICE

The present application is a US National Stage of International Application No. PCT/CN2016/095714, filed on Aug. 17, 2016, designating the United States, which claims the benefit of Chinese Patent Application No. 201510505895.9, filed with the Chinese Patent Office on Aug. 17, 2015 and entitled "Network attack detection method and device", which is hereby incorporated by reference in its entirety.

FIELD

The present application relates to the field of network security, and in particular to a network attack detection method and device.

BACKGROUND

Network attack is a big hidden danger which may influence network security. In order to ensure safe operation of the network, attack behaviors existing in the network needs to be detected timely.

In the existing network attack detection technology, a regular expression in a feature library is used for matching such network transmission data as HTTP (HyperText Transfer Protocol) request, so as to determine whether attack exists in transmission data.

This method needs to be based on a feature library with a large number of regular expressions, however, blind spots often exist in the feature library, and former features and later features in the feature library are often correlated, therefore, the labor cost of adding new features is higher, and even new features may influence old features and make old features become invalid, consequently, the accuracy and reliability of network attack detection cannot be ensured.

SUMMARY

The present application provides a network attack detection method and device to improve the accuracy of network attack detection.

The network attack detection method provided by the embodiment of the present application includes:

obtaining a to-be-detected character string, performing word segmentation for the to-be-detected character string, and obtaining words contained in the to-be-detected character string;

performing tuple generation processing to the words according to a preset tuple construction rule, and determining a tuple corresponding to the to-be-detected character string;

determining whether, in a pre-obtained attack model database, there is a model tuple corresponding to the determined tuple, and whether there is a model word corresponding to a first one of the obtained words, where the model tuple, an occurrence probability of the model tuple, the model word and an occurrence probability of the model word are stored in the attack model database;

if there are, acquiring occurrence probabilities of the corresponding model tuple and the corresponding model word, and determining, according to the occurrence probability of the corresponding model tuple and the occurrence probability of the corresponding model word, an attack probability corresponding to the to-be-detected character string; and if the attack probability is larger than or equal to a preset probability threshold, determining that the to-be-detected character string is a character string having an attack behavior.

In the method provided by the embodiment of the present application, for the current to-be-detected character string, namely, the network transmission data, when determining whether the to-be-detected character string has a network attack behavior, firstly, the to-be-detected character strings are subjected to word segmentation and tuple construction processing, so as to obtain corresponding tuples; then, in the pre-obtained attack model database storing the model tuples and occurrence probability thereof and the model words and occurrence probability thereof, the model tuple and the first word corresponding to the obtained tuples are matched, then the attack probability of the to-be-detected character string can be determined based on the corresponding model tuple and the occurrence probability of the corresponding model words, and if the attack probability is greater than a certain threshold, then the character strings are determined as character strings having an attack behavior. Since the occurrence probabilities of the model tuples and the model words stored in the attack model database are obtained through statistical analysis of a large number of attack samples, and can reflect the statistical features of the attack samples, therefore, based on the statistical features, the detection result of an attack behavior of the to-be-detected character strings can be more accurate.

Optionally, the determining, according to the occurrence probability of the corresponding model tuple and the occurrence probability of the corresponding model word, the attack probability corresponding to the to-be-detected character string includes:

adding the occurrence probability of the corresponding model tuple and the occurrence probability of the corresponding model word together, and obtaining the attack probability corresponding to the to-be-detected character string.

Furthermore, before obtaining the to-be-detected character string, performing word segmentation for the to-be-detected character string, and obtaining the words contained in the to-be-detected character string, the method further includes:

obtaining an attack sample set, wherein the attack sample set comprises respective attack sample character strings;

performing word segmentation for each of the attack sample character strings, and obtaining model words contained in the attack sample set;

performing tuple generation processing to the model words contained in each of the attack sample character strings according to a preset tuple construction rule, and determining model tuples contained in the attack sample set;

determining an occurrence probability of each of the model words contained in the attack sample set and an occurrence probability of each of the model tuples contained in the attack sample set; and associatively storing each of the model words contained in the attack sample set and the occurrence probability of the each of the model words in an attack model database, and associatively storing each of the model tuples contained in the attack sample set and the occurrence probability of each of the model tuples in the attack model database.

In the above method, since the occurrence probabilities of the model words and the model tuples stored in the attack model database is obtained through statistical analysis of a large number of attack samples, and can reflect the statistical feature of the attack sample, then based on the statistical feature, the detection result of the attack behavior of the to-be-detected character strings can be more accurate.

Optionally, the the determining the occurrence probability of each of the model words contained in the attack sample set includes:

determining the occurrence probability of each of the model words contained in the attack sample set according to a ratio of frequency of occurrence of the model word contained in the attack sample set to a total quantity of all model words contained in the attack sample set.

Optionally, the determining the occurrence probability of each of the model tuples contained in the attack sample set includes:

determining the occurrence probability of each of the model tuples contained in the attack sample set based on a following formula:

$$P(w_n|w_1,\ldots,w_{n-1})=\#(w_1,\ldots,w_{n-1},w_n)/\#(w_1,\ldots,w_{n-1})$$

where $w_1, \ldots, w_{n-1}, w_n$ is n model words contained in any model tuple, $P(w_n|w_1, \ldots, w_{n-1})$ is an occurrence probability of any model tuple, n is an integer greater than or equal to 2, $w_n$ is a first model word in the model tuple, $w_1, \ldots, w_{n-1}$ is a $(n-1)^{th}$ model word following the first model word; $\#(w_1, \ldots, w_{n-1}, w_n)$ is frequency of occurrence of the any model tuple in all the model tuples contained in the attack sample set, and $\#(w_1, \ldots, w_{n-1})$ is total frequency of occurrence of the model words $w_1, \ldots, w_{n-1}$ in all sample character strings contained in the attack sample set.

In the above method, based on the analysis of the occurrence probability of the words and the tuples in a large number of attack sample character strings, an attack model database is obtained. Although the specific forms of the attack character strings are updated constantly, the feature of attack behavior will not be changed fundamentally, namely, a large number of attack sample character strings possess similar probability statistical feature. Therefore, based on the attack model database, whether the to-be-detected character strings have an attack behavior can be accurately determined.

The embodiment of the present application provides a network attack detection device, including:

a first acquisition module, configured to obtain a to-be-detected character string, to perform word segmentation for the to-be-detected character string and to obtain words contained in the to-be-detected character string;

a first determination module, configured to perform tuple generation processing to the words according to a preset tuple construction rule, and to determine a tuple corresponding to the to-be-detected character string;

a second determination module, configured to determine whether, in a pre-obtained attack model database, there is a model tuple corresponding to the determined tuple, and whether there is a model word corresponding to a first one of the obtained words, where the model tuple, the occurrence probability of the model tuple, the model word and the occurrence probability of the model word are stored in the attack model database;

a third determination module, configured to acquire occurrence probabilities of the corresponding model tuple and the corresponding model word when the second determination module confirms existence of the corresponding model tuple and corresponding model word, and to determine an attack probability corresponding to the to-be-detected character string according to the occurrence probability of the corresponding model tuple and the occurrence probability of the corresponding model word; and a fourth determination module, configured to determine that the to-be-detected character string is a character string having an attack behavior when the attack probability is larger than or equal to a preset probability threshold.

Optionally, the third determination module is configured to add the occurrence probability of the corresponding model tuple and the occurrence probability of the corresponding model word together, and to obtain the attack probability corresponding to the to-be-detected character string.

Optionally, the device further includes:

a second acquisition module, configured to acquire an attack sample set, wherein the attack sample set comprises respective attack sample character strings;

a third acquisition module, configured to perform word segmentation for each of the attack sample character strings, and to obtain model words contained in the attack sample set;

a fifth determination module, configured to perform tuple generation processing to the model words contained in each of the attack sample character string according to a preset tuple construction rule, and to determine model tuples contained in the attack sample set;

a sixth determination module, configured to determine an occurrence probability of each of the model words contained in the attack sample set and an occurrence probability of each of the model tuples contained in the attack sample set; and a storage module, configured to associatively store each of the model words contained in the attack sample set and the occurrence probability of the each of the model words in an attack model database, and to associatively store each of the model tuples contained in the attack sample set and the occurrence probability of the each of model tuples in the attack model database.

Optionally, the sixth determination module is configured:

to determine the occurrence probability of each of the model words contained in the attack sample set according to a ratio of frequency of occurrence of the model word contained in the attack sample set to a total quantity of all model words contained in the attack sample set.

Optionally, the sixth determination module is further configured:

to determine the occurrence probability of each of the model tuples contained in the attack sample set based on a following formula:

$$P(w_n|w_1,\ldots,w_{n-1})=\#(w_1,\ldots,w_{n-1},w_n)/\#(w_1,\ldots,w_{n-1})$$

wherein $w_1, \ldots, w_{n-1}, w_n$ is n model words contained in any model tuple, $P(w_n|w_1, \ldots, w_{n-1})$ is an occurrence probability of any model tuple, n is an integer greater than or equal to 2, $w_n$ is a first model word in the model tuple, $w_1, \ldots, w_{n-1}$ is a $(n-1)^{th}$ model word following the first model word; $\#(w_1, \ldots, w_{n-1}, w_n)$ is frequency of occurrence of the any model tuple in all the model tuples contained in the attack sample set, and $\#(w_1, \ldots, w_{n-1})$ is total frequency of occurrence of the model words $w_1, \ldots, w_{n-1}$ in all sample character strings contained in the attack sample set.

The embodiment of the present application provides a network attack detection device, including a transceiver and a processor; where the transceiver is configured to obtain a to-be-detected character string;

the processor is configured to perform word segmentation for the to-be-detected character string, and to obtain words contained in the to-be-detected character string; and to perform tuple generation processing to the words according to a preset tuple construction rule, and to determine tuples corresponding to the to-be-detected character string;

the processor is configured to determine whether, in a pre-obtained attack model database, there is a model tuple corresponding to the determined tuple, and whether there is a model word corresponding to a first one of the obtained words, where the model tuple, an occurrence probability of the model tuple, the model word and an occurrence probability of the model word are stored in the attack model database; if there are, to acquire occurrence probabilities of the corresponding model tuple and the corresponding model word, and to determine, according to the occurrence probability of the corresponding model tuple and the occurrence probability of the corresponding model word, an attack probability corresponding to the to-be-detected character string; and if the attack probability is larger than or equal to a preset probability threshold, to determine that the to-be-detected character string is a character string having an attack behavior.

Optionally, the processor is specifically configured:

to add the occurrence probability of the corresponding model tuple and the occurrence probability of the corresponding model word together, and to obtain the attack probability corresponding to the to-be-detected character string.

Optionally, the transceiver is further configured to obtain an attack sample set, wherein the attack sample set includes respective attack sample character strings;

the processor is further configured to perform word segmentation for each of the attack sample character strings, and to obtain model words contained in the attack sample set; perform tuple generation processing to the model words contained in each of the attack sample character string according to a preset tuple construction rule, and to determine model tuples contained in the attack sample set; and to determine an occurrence probability of each of the model words contained in the attack sample set and an occurrence probability of each of the model tuples contained in the attack sample set;

the device further comprises:

a storage, configured to associatively store each of the model words contained in the attack sample set and the occurrence probability of the each of the model words in an attack model database, and to associatively store each of the model tuples contained in the attack sample set and the occurrence probability of the each of model tuples in the attack model database.

Optionally, the processor is configured:

to determine the occurrence probability of each of the model words contained in the attack sample set according to a ratio of frequency of occurrence of the model word contained in the attack sample set to a total quantity of all model words contained in the attack sample set.

Optionally, the processor is configured:

to determine the occurrence probability of each of the model tuples contained in the attack sample set based on a following formula:

$$P(w_n | w_1, \ldots, w_{n-1}) = \#(w_1, \ldots, w_{n-1}, w_n) / \#(w_1, \ldots, w_{n-1})$$

wherein $w_1, \ldots, w_{n-1}, w_n$ is n model words contained in any model tuple, $P(w_n | w_1, \ldots, w_{n-1})$ is an occurrence probability of any model tuple, n is an integer greater than or equal to 2, $w_n$ is a first model word in the model tuple, $w_1, \ldots, w_{n-1}$ is a $(n-1)^{th}$ model word following the first model word; $\#(w_1, \ldots, w_{n-1}, w_n)$ is frequency of occurrence of the any model tuple in all the model tuples contained in the attack sample set, and $\#(w_1, \ldots, w_{n-1})$ is total frequency of occurrence of the model words $w_1, \ldots, w_{n-1}$ in all sample character strings contained in the attack sample set.

BRIEF DESCRIPTION OF THE DRAWINGS

In order to illustrate the technical solution in the embodiment of the present invention more clearly, a brief introduction will be given below on the accompanying drawings needing to be used in the description of the embodiments.

DETAILED DESCRIPTION OF THE EMBODIMENTS

In order to make the objectives, technical solutions, and advantages of the present application more apparent, the present application will be described below in further details with reference to the drawings, and apparently the embodiments described below are only a part but not all of the embodiments of the present application. Based upon the embodiments of the present application, all of the other embodiments which can occur to those skilled in the art without any inventive effort shall fall into the protection scope of the present application.

The embodiments of the present application will be described in detail below in combination with the accompanying drawings of the description.

Figure 1:
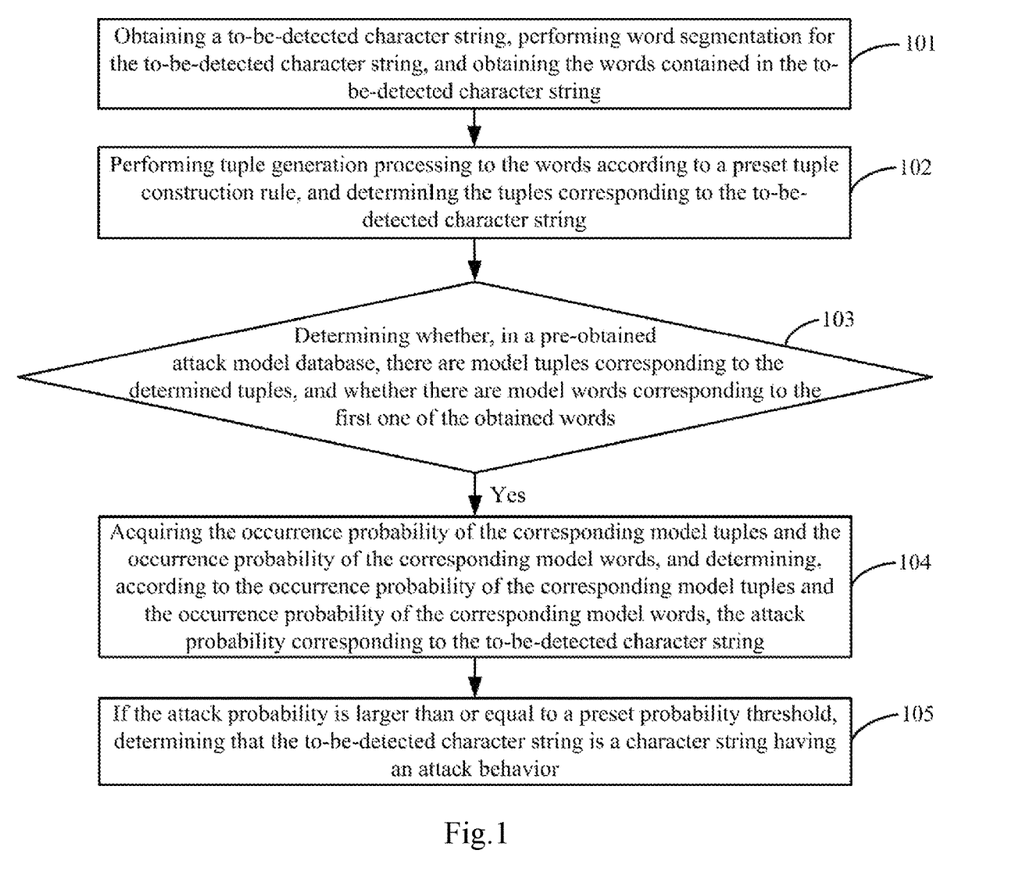
FIG. 1 is a flow chart of a first embodiment of the network attack detection method according to the present invention.

FIG. 1 is a flow chart of the first embodiment of the network attack detection method according to the present invention, and as shown in FIG. 1, the method includes the following operations.

Operation 101: obtaining a to-be-detected character string, performing word segmentation on the to-be-detected character string, and obtaining the words contained in the to-be-detected character string In the present embodiment, the above to-be-detected character strings refer to such network transmission data as HTTP request message. Based on such methods as semantic and character recognition, the words contained therein can be obtained by performing word segmentation on the to-be-detected character strings.

It should be noted that, one to-be-detected character string is not completely composed of English words, and also includes numbers, symbols and other elements. In the present embodiment, such elements are collectively known as words.

Operation 102: performing tuple generation processing on the words according to a preset tuple construction rule, and determining the tuple(s) corresponding to the to-be-detected character string.

The above preset tuple construction rule, for example, stipulates the size of the tuple, namely, the quantity of words contained in each tuple, and the positional relationship between words in each tuple.

For example, suppose that, there are three words of A, B and C in sequence obtained after word segmentation on the to-be-detected character string S, and suppose that the tuple construction rule stipulates that the size of the tuple is two, namely, each tuple can include two words, and for each word in sequence, the corresponding tuple is constituted by the word itself and the adjacent word thereafter. Then, the tuple corresponding to the to-be-detected character string S includes the two tuples of (A, B) and (B, C).

Operation 103: determining whether, in a pre-obtained attack model database, there are model tuples corresponding to the determined tuples, and whether there are model words corresponding to the first one of the obtained words, if there are, then executing operation 104, otherwise, finishing.

Where the model tuples, the occurrence probability of each model tuple, the model words and the occurrence probability of each model word are stored in the attack model database.

Operation 104: acquiring the occurrence probability of the corresponding model tuples and the occurrence probability of the corresponding model words, and determining, according to the occurrence probability of the corresponding model tuples and the occurrence probability of the corresponding model words, the attack probability corresponding to the to-be-detected character string.

Operation 105: if the attack probability is larger than or equal to a preset probability threshold, determining that the to-be-detected character string is a character string having an attack behavior.

In the present embodiment, the above attack model database is established in advance, and is obtained after statistical analysis of a large number of pre-obtained attack sample character strings, specifically, the model tuples and the occurrence probability of each model tuple as well as the model words and the occurrence probability of each model word stored in the attack model database are all obtained through statistical analysis of a large number of attack sample character strings.

Where the model words include the words obtained after a large number of attack sample character strings are respectively subjected to word segmentation; and the model tuples include the tuples obtained after the model words contained in each attack sample character string are subjected to tuple establishment.

The specific establishment process of the attack model database is described in the following embodiments. In the present embodiment, only the use process of the attack model database is involved.

Specifically, after the words and tuples contained in the to-be-detected character string are obtained, the attack model database is inquired, so as to determine whether, in the attack model database, there are model tuples corresponding to the obtained tuples, and whether there are model words corresponding to the first one of the determined words obtained after word segmentation for the to-be-detected character strings, if there are, then respectively acquiring the corresponding occurrence probabilities.

Here, to determine whether there are model words corresponding to the first one of the determined words obtained after word segmentation for the to-be-detected character strings is determined by the calculation formula of attack probability of the to-be-detected character strings, and will be introduced below.

After obtaining the occurrence probability of the corresponding model tuples and the occurrence probability of the model word corresponding to the first word, the attack probability corresponding to the to-be-detected character string can be obtained through the following manner:

adding the occurrence probability of the corresponding model tuples and the occurrence probability of the corresponding model words.

Still based on the above example, after the to-be-detected character string S is subjected to word segmentation, the first obtained word is A. Suppose that the word A, the tuples (A,B) and (B,C) exist in the attack model database, and the occurrence probability of A satisfies the formula of $P(A)=p1$, the occurrence probability of the tuple (A,B) satisfies the formula of $P(A|B)=p2$, and the occurrence probability of the tuple (B,C) satisfies the formula of $P(B|C)=p3$.

Therefore, the probability P(S) of the to-be-detected character string S satisfies the following formula: $P(S)=P(A)+P(A|B)+P(B|C)=p1+p2+p3$.

Furthermore, if (p1+p2+p3) is larger than a preset probability threshold p0, then it indicates that the to-be-detected character string S has multiple tuples and words with an attack feature, at this time, the to-be-detected character string S is determined to be a character string having an attack behavior.

In the present embodiment, for the current to-be-detected character strings, namely, the network transmission data, when determining whether the to-be-detected character strings possess network attack behaviors, firstly, word segmentation and tuple construction processing are performed for the to-be-detected character strings, so as to obtain corresponding tuples; then, in the pre-obtained attack model database storing the model tuples and the occurrence probability thereof and the model words and the occurrence probability thereof, the model tuples and the model word respectively corresponding to the obtained tuples and the first word are matched, then the attack probability of the to-be-detected character string can be determined based on the occurrence probabilities of the corresponding model tuple and the corresponding model word. And if the attack probability is greater than a certain threshold, then the character string is determined to be character string with attack behaviors. Since the occurrence probabilities of the model words and the model tuples stored in the attack model database are obtained through statistical analysis of a large number of attack samples, and can reflect the statistical features of the attack samples, therefore, based on the statistical features, the detection result of attack behaviors of the to-be-detected character strings can be more accurate.

Figure 2:
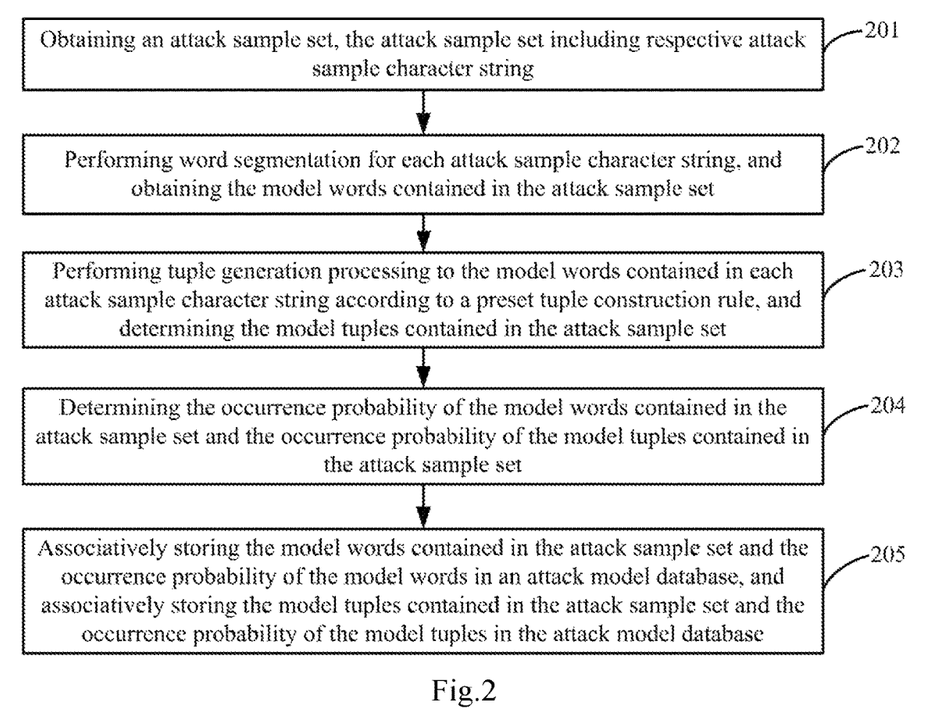
FIG. 2 is a flow chart of a second embodiment of the network attack detection method according to the present invention.

FIG. 2 is a flow chart of the second embodiment of the network attack detection method according to the present invention, as shown in FIG. 2, before operation 101, the present embodiment further includes the following operations.

Operation 201: obtaining an attack sample set, where the attack sample set includes the respective attack sample character strings.

The respective attack sample character strings are the pre-obtained character strings having a network attack behavior.

Operation 202: performing word segmentation for each attack sample character string, and obtaining the model words contained in the attack sample set.

With reference to the above embodiment, each attack sample character string is subjected to word segmentation to obtain the model words contained in each attack sample character string, furthermore, the model words contained in each attack sample character string are merged to obtain the model words contained in the attack sample set.

Operation 203: performing tuple generation processing to the model words contained in each attack sample character string according to a preset tuple construction rule, and determining the model tuples contained in the attack sample set.

With reference to the above embodiment, the model words contained in each attack sample character string is subjected to tuple generation processing to obtain the model tuples contained in each attack sample character string, furthermore, the model tuples contained in each attack sample character string are merged to obtain the model tuples contained in the attack sample set.

Operation 204: determining the occurrence probability of each model word contained in the attack sample set and the occurrence probability of each model tuple contained in the attack sample set.

For example, suppose that the attack sample set includes two attack sample character strings S1 and S2, there are three model words of A, B and C in sequence after word segmentation for the string S1, then two tuples of (A,B) and (B,C) are obtained; and there are three model words of A, C and D after word segmentation for the string S2, and two tuples of (A,C) and (C,D) are obtained.

Here, the occurrence probability of each model word contained in the attack sample set is determined based on the following manner:

the occurrence probability of the model word contained in the attack sample set is determined according to the ratio of the frequency of occurrence of the model word contained in the attack sample set to the total number of all the model words contained in the attack sample set.

Based on the above example, for the model word C, the frequency of occurrence is two, and the total number of the model words contained in the attack sample set is 6, therefore, the occurrence probability is 2/6.

Where the occurrence probability of each model tuple contained in the attack sample set is determined based on the following formula:

$$P(w_n | w_1, \ldots, w_{n-1}) = \#(w_1, \ldots, w_{n-1}, w_n) / \#(w_1, \ldots, w_{n-1})$$

Here $w_1, \ldots, w_{n-1}, w_n$ is the n model words contained in any model tuple, $P(w_n | w_1, \ldots, w_{n-1})$ is the occurrence probability of the any model tuple, n is an integer greater than or equal to 2, $w_n$ is the first model word in the model tuple, $w_1, \ldots, w_{n-1}$ is the (n-1)$^{th}$ model word following the first model word; $\#(w_1, \ldots, w_{n-1}, w_n)$ is the frequency of occurrence of the any model tuple in all the model tuples contained in the attack sample set, and $\#(w_1, \ldots, w_{n-1})$ the total frequency of occurrence of the model words $w_1, \ldots, w_{n-1}$ in all the sample character strings contained in the attack sample set.

Based on the above example, for the tuple (A,C), the occurrence probability is $P(A|C) = \#(A,C)/\#(A)$.

Where $\#(A,C)=1$, $\#(A)=2$, then $P(A|C)=½$.

Operation 205: associatively storing the model words contained in the attack sample set and the occurrence probabilities of the model words in an attack model database, and associatively storing the model tuples contained in the attack sample set and the occurrence probabilities of the model tuples in the attack model database.

In the present embodiment, based on the analysis of the occurrence probability of the words and the tuples in a large number of attack sample character strings, an attack model database is obtained. Although the specific forms of the attack character strings are updated constantly, the feature of attack behavior will not be changed fundamentally, namely, a large number of attack sample character strings possess the similar probability statistical feature. Therefore, based on the attack model database, whether the to-be-detected character strings have an attack behavior can be accurately determined.

Figure 3:
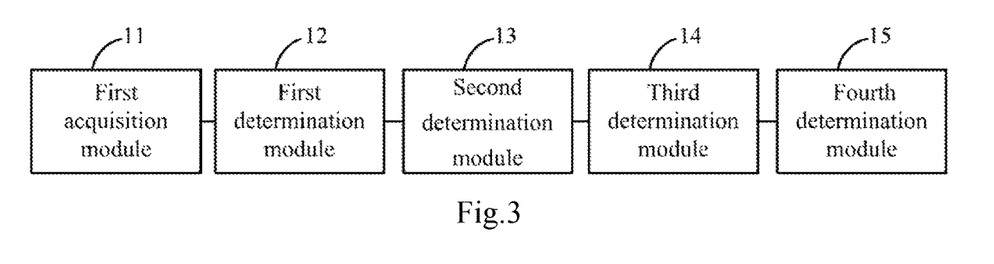
FIG. 3 is a schematic structural diagram of a first embodiment of the network attack detection device according to the present invention.

FIG. 3 is a schematic structural diagram of the first embodiment of the network attack detection device according to the present invention. As shown in FIG. 3, the terminal device includes: a first acquisition module 11, a first determination module 12, a second determination module 13, a third determination module 14 and a fourth determination module 15.

The first acquisition module 11 is configured to obtain a to-be-detected character string, to perform word segmentation for the to-be-detected character string and to obtain the words contained in the to-be-detected character string.

The first determination module 12 is configured to perform tuple generation processing to the words according to a preset tuple construction rule, and to determine the tuples corresponding to the to-be-detected character string.

The second determination module 13 is configured to determine whether, in a pre-obtained attack model database, there are model tuples corresponding to the determined tuples, and whether there are model words corresponding to the first one of the determined words, where the model tuples, the occurrence probability of each model tuple, the model words and the occurrence probability of each model word are stored in the attack model database.

The third determination module 14 is configured to acquire the occurrence probabilities of the corresponding model tuples and the corresponding model words when the second determination module confirms the existence of the corresponding model tuples and corresponding model words, and to determine the attack probability corresponding to the to-be-detected character string according to the occurrence probability of the corresponding model tuples and the occurrence probability of the corresponding model words.

The fourth determination module 15 is configured to determine that the to-be-detected character string is a character string having an attack behavior when the attack probability is larger than or equal to a preset probability threshold.

Where the third determination module 14 is specifically configured:

to add the occurrence probability of the corresponding attack model tuples and the occurrence probability of the corresponding model words together, so as to obtain the attack probability corresponding to the to-be-detected character string.

The device of the present embodiment can be configured to execute the technical solution of the method according to the embodiment as shown in FIG. 1, and the implementation principle and technical effect are similar, and will not be repeated redundantly herein.

Figure 4:
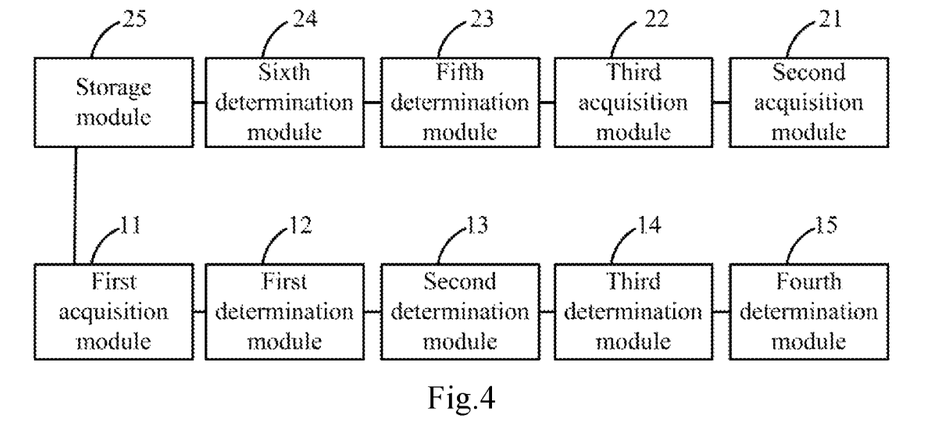
FIG. 4 is a schematic structural diagram of a second embodiment of the network attack detection device according to the present invention.

FIG. 4 is a schematic structural diagram of the second embodiment of the network attack detection device in the present invention. As shown in FIG. 4, on the basis of the embodiment shown in FIG. 3, the device further includes: a second acquisition module 21, a third acquisition module 22, a fifth determination module 23, a sixth determination module 24 and a storage module 25.

The second acquisition module 21 is configured to acquire the attack sample set, where the attack sample set includes the attack sample character strings.

The third acquisition module 22 is configured to perform word segmentation for each attack sample character string, and to obtain the model words contained in the attack sample set.

The fifth determination module 23 is configured to perform tuple generation processing to the model words contained in each attack sample character string according to a preset tuple construction rule, so as to determine the model tuples contained in the attack sample set.

The sixth determination module 24 is configured to determine the occurrence probabilities of the model words contained in the attack sample set and the occurrence probabilities of the model tuples contained in the attack sample set.

The storage module 25 is configured to associatively store the model words contained in the attack sample set and the occurrence probabilities of the model words in an attack model database, and to associatively store the model tuples contained in the attack sample set and the occurrence probabilities of the model tuples in the attack model database.

Where the sixth determination module 24 is specifically configured:

to determine the occurrence probability of each model word contained in the attack sample set according to the ratio of the frequency of occurrence of the model word contained in the attack sample set to the total number of all the model words contained in the attack sample set.

Where the sixth determination module 24 is further configured:

to determine the occurrence probability of each model tuple contained in the attack sample set according to the following formula:

$$P(w_n|w_1,\ldots,w_{n-1})=\#(w_1,\ldots,w_{n-1},w_n)/\#(w_1,\ldots,w_{n-1})$$

here $w_1, \ldots, w_{n-1}, w_n$ is the n model words contained in any model tuple, $P(w_1, \ldots, w_{n-1})$ is the occurrence probability of the any model tuple, n is an integer greater than or equal to 2, $w_n$ is the first model word in the model tuple, $w_1, \ldots, w_{n-1}$ is the $(n-1)^{th}$ model word following the first model word; $\#(w_1, \ldots, w_{n-1}, w_n)$ is the frequency of occurrence of the any model tuple in all the model tuples contained in the attack sample set, and $\#(w_1, \ldots, w_{n-1})$ is the total frequency of occurrence of the model words $w_1, \ldots, w_{n-1}$ in all the sample character strings contained in the attack sample set.

The device of the present embodiment can be configured to execute the technical solution of the method embodiment as shown in FIG. 2, and the implementation principle and technical effect are similar, and will not be repeated redundantly herein.

Figure 5:
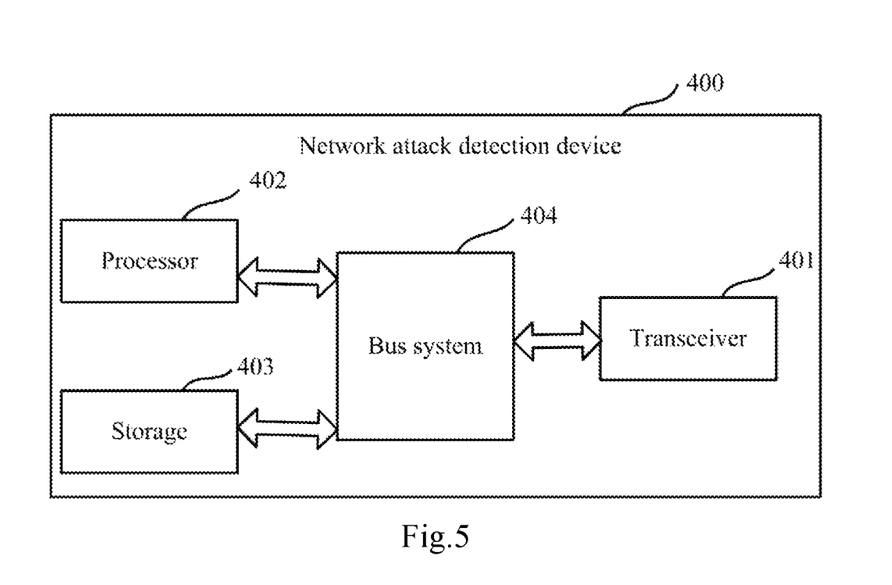
FIG. 5 is a schematic structural diagram of a third embodiment of the network attack detection device according to the present invention.

Based on the same technical conception, the embodiment of the present application provides another network attack detection device. FIG. 5 is a schematic structural diagram of the third embodiment of the network attack detection device in the present invention, and the network attack detection device 400 includes a transceiver 401, a processor 402, a storage 403 and a bus system 404.

Where the storage 403 is configured to store programs. Specifically, the programs can include program codes, and the program codes include computer operational instructions. The storage 403 may be a random access memory (RAM), and may also be a non-volatile memory, such as at least one disc storage. Only one storage is shown in the figure. Of course, multiple storages can also be set based on requirements. The storage 403 can also be the storage in the processor 402.

The storage 403 stores the following elements: executable modules or data structures, or their subsets, or their supersets:

operational instruction(s), which include various operational instructions and are configured to implement various operations.

operational system(s), which include various system programs and are configured to implement various basic services and to process hardware-based tasks.

The processor 402 controls the operation of the network attack detection device 400, and the processor 402 can also be called as Central Processing Unit (CPU). In specific application, all the components of the network attack detection device 400 are coupled together via a bus system 404, where, in addition to a data bus, the bus system 404 further includes a power bus, a control bus and status signal bus, etc. However, for clear description, all the buses are marked as the bus system 404 in the figure. For the convenience of expression, the bus system is merely illustratively drawn out in FIG. 5.

The above method disclosed by the embodiment of the present application can be applied to the processor 402 or can be implemented by the processor 402. The processor 402 may be an integrated circuit chip with the capability of signal processing. In the implementation process, the steps of the above method can be finished through the integrated logic circuit of the hardware or software instructions in the processor 402. The above processor 402 can be a general-purpose processor, a digital signal processor (DSP), an application specific integrated circuit (ASIC), a field programmable gate array (FPGA) or other programmable logic device, a discrete gate or transistor logic device, and a discrete hardware component. The methods, steps and logic block diagrams disclosed in the embodiment of the present invention can be implemented or executed. The general-purpose processor can be a microprocessor, or the processor can also be any ordinary processor, etc. The steps of the method disclosed in combination with the embodiment of the present application can be directly reflected as being executed by a hardware decoding processor, or can be executed through the combination of hardware and software modules in the decoding processor. The software module can be located in mature storage medium in the field, such as a random access memory, a flash memory, a read-only memory, a programmable read-only memory or an electrically erasable programmable read-only memory, and a register. The storage medium is located in the storage 403, and the processor 402 reads the information in the storage 403 and executes the following steps in combination with its hardware.

The transceiver 401 is configured to obtain a to-be-detected character string.

The processor 402 is configured to perform word segmentation for the to-be-detected character string, and to obtain the words contained in the to-be-detected character string; and to perform tuple generation processing to the words according to a preset tuple construction rule, so as to determine the tuples corresponding to the to-be-detected character string.

The processor 402 is further configured to determine whether, in a pre-obtained attack model database, there are model tuples corresponding to the determined tuples, and whether there are model words corresponding to the first one of the determined words, where the model tuples, the occurrence probability of each model tuple, the model words and the occurrence probability of each model word are stored in the attack model database; if there are, to acquire the occurrence probabilities of the corresponding model tuples and the corresponding model words, and to determine, according to the occurrence probabilities of the corresponding model tuples and the occurrence probabilities of the corresponding model words, the attack probability corresponding to the to-be-detected character string; and if the attack probability is larger than or equal to a preset probability threshold, to determine that the to-be-detected character string is a character string having an attack behavior.

Optionally, the processor 402 is specifically configured:

to add the occurrence probabilities of the corresponding attack model tuples and the occurrence probabilities of the corresponding model words together, and to obtain the attack probability corresponding to the to-be-detected character string.

Optionally, the transceiver 401 is further configured to obtain an attack sample set, where the attack sample set includes each attack sample character string.

The processor 402 is further configured:

to perform word segmentation for each attack sample character string, and to obtain the model words contained in the attack sample set; to perform tuple generation processing to the model words contained in each attack sample character string according to a preset tuple construction rule, so as to determine the model tuples contained in the attack sample set; and to determine the occurrence probability of each model word contained in the attack sample set and the occurrence probability of each model tuple contained in the attack sample set.

The storage 403 is configured to associatively store the model words contained in the attack sample set and the occurrence probabilities of the model words in an attack model database, and to associatively store the model tuples contained in the attack sample set and the occurrence probabilities of the model tuples in the attack model database.

Optionally, the processor 402 is specifically configured:

to determine the occurrence probability of each model word contained in the attack sample set according to the ratio of the frequency of occurrence of the model word contained in the attack sample set to the total number of all the model words contained in the attack sample set.

Optionally, the processor 402 is specifically configured:

to determine the occurrence probability of each model tuple contained in the attack sample set according to the following formula:

$$P(w_n | w_1, \ldots, w_{n-1}) = \#(w_1, \ldots, w_{n-1}, w_n) / \#(w_1, \ldots, w_{n-1})$$

where $w_1, \ldots, w_{n-1}, w_n$ is the n model words contained in any model tuple, $P(w_n | w_1, \ldots, w_{n-1})$ is the occurrence probability of the any model tuple, n is an integer greater than or equal to 2, $w_n$ is the first model word in the model tuple, $w_1, \ldots, w_{n-1}$ is the $(n-1)^{th}$ model word following the first model word; $\#(w_1, \ldots, w_{n-1}, w_n)$ is the frequency of occurrence of the any model tuple in all the model tuples contained in the attack sample set, and $\#(w_1, \ldots, w_{n-1})$ is the total frequency of occurrence of the model words $w_1, \ldots, w_{n-1}$ in all the sample character strings contained in the attack sample set.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner, so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device, so that a series of operational steps are performed on the computer or the other programmable data processing device to create a computer implemented process, so that the instructions executed on the computer or the other programmable device provide steps for performing the functions specified in the flow(s) of the flow chart and/or the block(s) of the block diagram.

Although the preferred embodiments of the present application have been described, however, those skilled in the art can make additional variations and modifications to these embodiments once they learn about the concept of basic creativity. Therefore, the appended claims are interpreted to encompass preferred embodiments and all the variations and modifications falling within the scope of the present application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A network attack detection method, the method comprising:

obtaining a to-be-detected character string, performing word segmentation for the to-be-detected character string, and obtaining words contained in the to-be-detected character string;

performing tuple generation processing to the words according to a preset tuple construction rule, and determining a tuple corresponding to the to-be-detected character string;

determining whether, in a pre-obtained attack model database, there is a model tuple corresponding to the determined tuple, and whether there is a model word corresponding to a first one of the obtained words, wherein the model tuple, an occurrence probability of the model tuple, the model word and an occurrence probability of the model word are stored in the attack model database;

if there are, acquiring occurrence probabilities of the corresponding model tuple and the corresponding model word, and determining, according to the occurrence probability of the corresponding model tuple and the occurrence probability of the corresponding model word, an attack probability corresponding to the to-be-detected character string; and if the attack probability is larger than or equal to a preset probability threshold, determining that the to-be-detected character string is a character string having an attack behavior, wherein before obtaining the to-be-detected character string, performing word segmentation for the to-be-detected character string, and obtaining the words contained in the to-be-detected character string, the method further comprises:

obtaining an attack sample set, wherein the attack sample set comprises respective attack sample character strings;

performing word segmentation for each of the attack sample character strings, and obtaining model words contained in the attack sample set;

performing tuple generation processing to the model words contained in each of the attack sample character strings according to a preset tuple construction rule, and determining model tuples contained in the attack sample set;

determining an occurrence probability of each of the model words contained in the attack sample set and an occurrence probability of each of the model tuples contained in the attack sample set; and associatively storing each of the model words contained in the attack sample set and the occurrence probability of the each of the model words in an attack model database, and associatively storing each of the model tuples contained in the attack sample set and the occurrence probability of each of the model tuples in the attack model database.

2. The method of claim 1, wherein the determining, according to the occurrence probability of the corresponding model tuple and the occurrence probability of the corresponding model word, the attack probability corresponding to the to-be-detected character string comprises:

adding the occurrence probability of the corresponding model tuple and the occurrence probability of the corresponding model word together, and obtaining the attack probability corresponding to the to-be-detected character string.

3. The method of claim 1, wherein the determining the occurrence probability of each of the model words contained in the attack sample set comprises:

determining the occurrence probability of each of the model words contained in the attack sample set according to a ratio of frequency of occurrence of the model word contained in the attack sample set to a total quantity of all model words contained in the attack sample set.

4. The method of claim 1, wherein the determining the occurrence probability of each of the model tuples contained in the attack sample set comprises:

determining the occurrence probability of each of the model tuples contained in the attack sample set based on a following formula:

$$P(w_n | w_1, \ldots, w_{n-1}) = \#(w_1, \ldots, w_{n-1}, w_n) / \#(w_1, \ldots, w_{n-1})$$

wherein $w_1, \ldots, w_{n-1}, w_n$ is n model words contained in any model tuple, $P(w_n | w_1, \ldots, w_{n-1})$ is an occurrence probability of any model tuple, n is an integer greater than or equal to 2, $w_n$ is a first model word in the model tuple, $w_1, \ldots, w_{n-1}$ is a $(n-1)^{th}$ model word following the first model word; $\#(w_1, \ldots, w_{n-1}, w_n)$ is frequency of occurrence of the any model tuple in all the model tuples contained in the attack sample set, and $\#(w_1, \ldots, w_{n-1})$ is total frequency of occurrence of the model words $w_1, \ldots, w_{n-1}$ in all sample character strings contained in the attack sample set.

5. A network attack detection device, comprising a transceiver and a processor, wherein the transceiver is configured to obtain a to-be-detected character string;

the processor is configured to perform word segmentation for the to-be-detected character string, and to obtain words contained in the to-be-detected character string; and to perform tuple generation processing to the words according to a preset tuple construction rule, and to determine tuples corresponding to the to-be-detected character string;

the processor is configured to determine whether, in a pre-obtained attack model database, there is a model tuple corresponding to the determined tuple, and whether there is a model word corresponding to a first one of the obtained words, wherein the model tuple, an occurrence probability of the model tuple, the model word and an occurrence probability of the model word are stored in the attack model database; if there are, to acquire occurrence probabilities of the corresponding model tuple and the corresponding model word, and to determine, according to the occurrence probability of the corresponding model tuple and the occurrence probability of the corresponding model word, an attack probability corresponding to the to-be-detected character string; and if the attack probability is larger than or equal to a preset probability threshold, to determine that the to-be-detected character string is a character string having an attack behavior, wherein the transceiver is further configured to obtain an attack sample set, wherein the attack sample set includes respective attack sample character strings, wherein the processor is further configured to perform word segmentation for each of the attack sample character strings, and to obtain model words contained in the attack sample set; perform tuple generation processing to the model words contained in each of the attack sample character string according to a preset tuple construction rule, and to determine model tuples contained in the attack sample set; and to determine an occurrence probability of each of the model words contained in the attack sample set and an occurrence probability of each of the model tuples contained in the attack sample set, and wherein the device further comprises:

a storage, configured to associatively store each of the model words contained in the attack sample set and the occurrence probability of the each of the model words in an attack model database, and to associatively store each of the model tuples contained in the attack sample set and the occurrence probability of the each of model tuples in the attack model database.

6. The device of claim 5, wherein the processor is configured:

to add the occurrence probability of the corresponding model tuple and the occurrence probability of the corresponding model word together, and to obtain the attack probability corresponding to the to-be-detected character string.

7. The device of claim 5, wherein the processor is configured to:
- to determine the occurrence probability of each of the model words contained in the attack sample set according to a ratio of frequency of occurrence of the model word contained in the attack sample set to a total quantity of all model words contained in the attack sample set.

8. The device of claim 5, wherein the processor is configured to:
- to determine the occurrence probability of each of the model tuples contained in the attack sample set based on a following formula:

$$P(w_n | w_1, \ldots, w_{n-1}) = \#(w_1, \ldots, w_{n-1}, w_n) / \#(w_1, \ldots, w_{n-1})$$

wherein $w_1, \ldots, w_{n-1}, w_n$ is n model words contained in any model tuple, $P(w_n | w_1, \ldots, w_{n-1})$ is an occurrence probability of any model tuple, n is an integer greater than or equal to 2, $w_n$ is a first model word in the model tuple, $w_1, \ldots, w_{n-1}$ is a $(n-1)^{th}$ model word following the first model word; $\#(w_1, \ldots, w_{n-1}, w_n)$ is frequency of occurrence of the any model tuple in all the model tuples contained in the attack sample set, and $\#(w_1, \ldots, w_{n-1})$ is total frequency of occurrence of the model words $w_1, \ldots, w_{n-1}$ in all sample character strings contained in the attack sample set.

* * * * *